United States Patent [19]

Vinal

[11] 3,911,429

[45] Oct. 7, 1975

[54] SELF-ENERGIZED MAGNETIC KEYS

[75] Inventor: Albert Watson Vinal, Cary, N.C.

[73] Assignee: International Business Machines Corporation, Armonk, N.Y.

[22] Filed: Apr. 8, 1974

[21] Appl. No.: 458,609

[52] U.S. Cl. .......... 340/365 L; 307/88 MP; 323/92; 336/110; 340/174 PM

[51] Int. Cl.[2] .......... G08C 1/00

[58] Field of Search .......... 340/365 R, 365 L; 338/32 H; 323/92, 94 H; 307/88 MP, 88 LC

[56] References Cited

UNITED STATES PATENTS 3,698,531 10/1972 Bernin .......... 197/98

*Primary Examiner*—Thomas B. Habecker
*Assistant Examiner*—James Groody
*Attorney, Agent, or Firm*—Edward H. Duffield

[57] ABSTRACT

A magnetically actuated, self-scanned, self-energized bounceless, non-contacting, non-teasible, tactile feel N-key roll keyboard mechanism is disclosed in which an improved key actuator and sensor are utilized is disclosed. The actuator features the creation of a complete 180° tangential flux reversal across the area of the sensor which, in turn, produces the maximum flux change and the best sensing conditions. The sensor incorporated in the keyboard utilizes a switchable, coupled magnetic film and one or more sensing coils in association therewith to produce electrical signals in response to the flux reversal.

14 Claims, 22 Drawing Figures

SELF-ENERGIZED MAGNETIC KEYS

FIELD OF THE INVENTION

This invention relates generally to data entry keyboards and to key actuator means therefor. More specifically, it relates to magnetically energized keyboard data encoders and magnetic snap action switch mechanisms.

PRIOR ART

A wide variety of data entry keyboards and mechanisms have been previously devised utilizing magnetic actuator means in combination with sensing devices, such as the so-called Hall effect semiconductive sensors, or magnetic flux sensing coils or other signal producing elements which are responsive to a change in the magnetic field intensity or flux experienced by the element. These previous designs have not, however, provided a complete 180° flux reversal. Instead, they have generally utilized variations in flux intensity and in unidirectional flux intensity, thereby limiting the magnitude of signals provided by the sensor devices. This approach has, in turn, involved the use of sophisticated scanning and amplifying equipment to accurately pick up the signals generated and to create usable amplitude amplified signals therefrom. Typical samples from the prior art are shown in U.S. Pat. Nos. 3,601,568 to Brescia et al.; to Kikuchi et al. in 3,690,432; to Delatour in 3,129,418; to Tasaku Wada et al. in 3,363,737; to Scuitto in 3,585,297; to Pear, Jr. in 3,573,808; to Gabor in 3,588,875; to Speiser in 3,065,366; to Britton et al. in 3,718,828; to Seldon in 3,555,313; to Sugawara et al. in 3,739,204; and to Wales in 3,273,091.

The great variety of prior art approaches to the magnetic keyboard technology, such as are exemplified by the above-noted patents, generally have provided contactless and bounceless operation. In addition, some of the devices would also be selfscanned and self-energized, i.e., no source of power connected to the key mechanism would be required. However, none of the prior art devices have provided the complete 180° flux reversal which is desired to provide the maximum amplitude of generated signals nor have the actuators been designed to provide an automatic N-key roll capability.

OBJECTS OF THE INVENTION

In light of the foregoing prior art and the difficulties therewith, it is an object of this invention to provide an improved magnetic key actuator which creates a complete flux reversal along one axis in the area where the magnetic sensing device is located.

It is another object of this invention to provide an improved magnetic actuator which automatically provides signals for N-key roll and is self-scanned and self-energized.

Still a further object of this invention is to provide an improved magnetic sensor utilizing switchable magnetic memory elements.

SUMMARY OF THE INVENTION

The foregoing and other objects of the invention are met by providing a magnetic actuator device in which a doubly magnetized (i.e., two sets of north-south poles in opposition) ring magnet. This magnet serves as the downward breakaway restraint mechanism in combination with a first restraining keeper to provide the snap action in a key actuator. The keeper simultaneously shunts the magnetic field of one of the doubly magnetized faces of the magnet pole to reduce the demagnetizing effect of these poles on their counterparts. A second restraint means at the bottom of the key stroke provides a similar effect on the reverse or upward direction. The central annular portion of the ring magnet creates a 180° directional change in diametral flux during its motion from breakaway at the first restraint means to breakaway from the second restraint means. At the point in the path of the ring magnet's travel where the flux reversal occurs, a magnetic sensing means (which is preferably a coupled film memory element) is located and which is wound with one or more sense windings.

To aid in understanding the preferred embodiment of the invention, the major components of it will be discussed separately with the actuator, the sensor, and the total keyboard combination being discussed individually in the following paragraphs.

Figure 1:
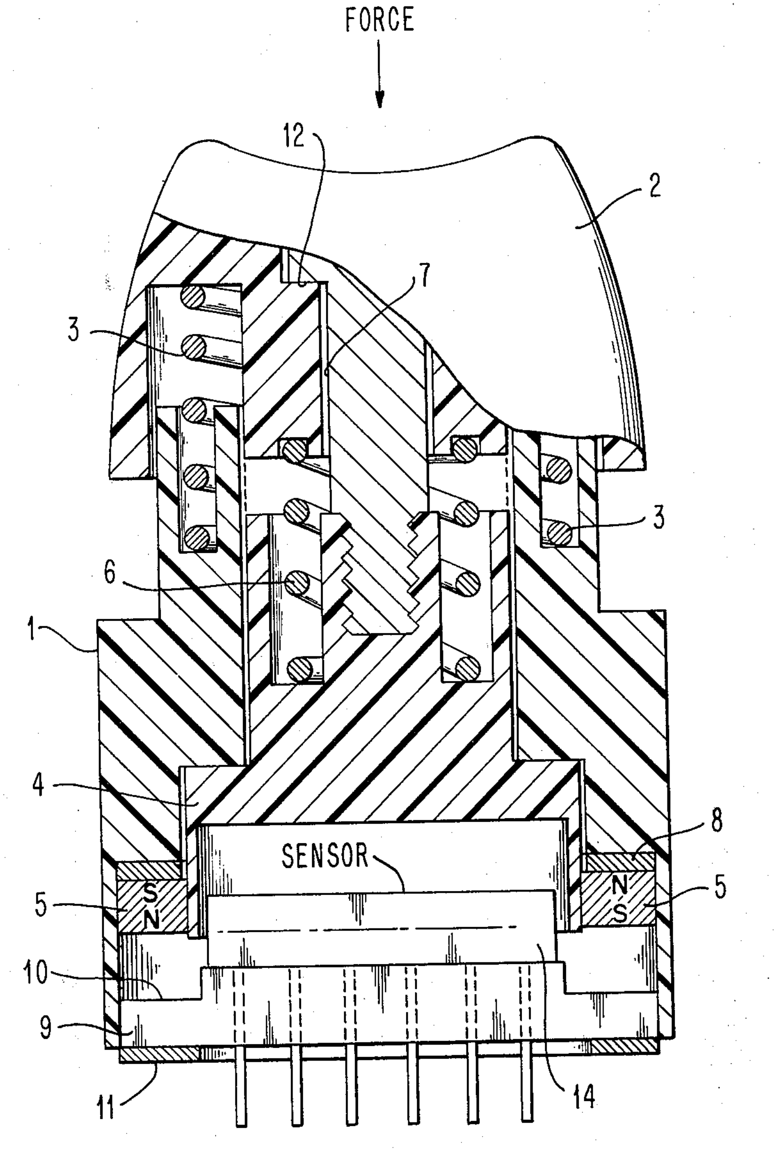
FIG. 1 illustrates a partial cross-sectional view of a key actuator according to the present invention.

With reference to the actuator of the present invention, FIG. 1 illustrates one form of a preferred embodiment of an actuator. In FIG. 1, a body or housing 1 made of molded plastic or other suitable non-conductive material is shown in cross-section. Body 1 serves to house the operative mechanism and the sensor. The sensor is illustrated merely as a block in FIG. 1. The operative mechanism consists of a key top or cap 2 to which finger force from the operator would be applied in the vertical direction downward as illustrated. Key top 2 is biased in the upward vertical direction by a spring bias means 3 and is cut away or formed to fit in sliding engagement over the top portion of body 1. A plunger 4, which serves as a carrier means for a doubly magnetized permanent magnet 5, is connected, with a small allowance for lost motion via snap spring 6 and sliding joints 7, to the key top 2. An upper, or first restraint means 8, made of soft steel or iron serves as a keeper ring for the north-south pole pair of magnet 5 illustrated in contact therewith in FIG. 1. The force of attraction between magnet 5 and ring 8, which is affixed to body 1, must be overcome before plunger 4 and magnet 5 can move in the vertical direction as will be discussed later. A base 9 affixed to housing 1 serves as a support means for the sensor block. The sensor block is not shown in detail in FIG. 1 for the purpose of simplicity, but the sensor block has its central axis aligned so that the lower south-north magnetic poles of magnet 5 are in the plane of the central axis of the sensor when the magnet 5 is against keeper 8. This is for a reason that will be discussed later.

The base support means or pedestal 9 is affixed to the housing 1 and has a step or level portion 10 which will stop the downward movement of plunger 4 and magnet 5 with the upper northsouth magnetic poles of magnet 5 in vertical axial alignment with the center horizontal plane of the sensor at the downward limit of travel. A lower keeper ring, which serves as a second restraint means 11, effectively serves to shunt the lower south-north magnetic pole pair of magnets and to provide an attractive force for the magnet 5 tending to maintain plunger 4 in the downward position. When the acting force is released, the upward biasing force of spring bias means 3 overcomes the attractive force to snap magnet 5 and plunger 4 back upward due to the upward pressure applied to plunger 4 by the lifting flange and ledge in key button 2. This is illustrated as ledge 12 in FIG. 1. The complete flux reversal in the diametral direction across the aperture of ring magnet 5 changes the flux level experienced by the sensor along its horizontal axis from the maximum intensity in one direction to the maximum intensity in the completely opposite direction. This provides a complete 180° flux direction change so that the flux field experienced by the sensor changes from maximum amplitude in the one direction to the maximum amplitude in the other direction and therefore necessarily passes through a zero flux level. This creates ideal conditions for sensing a change in magnetic flux as will be apparent to those skilled in the art.

Figure 2A:
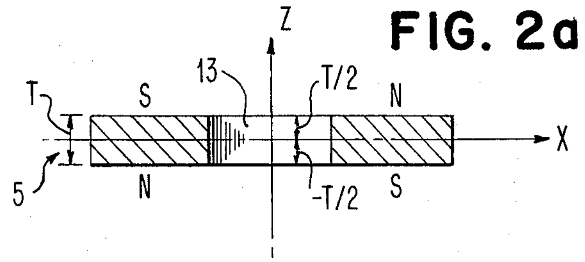
FIGS. 2*a* through 2*d* illustrate a doubly polarized permanent magnet and its general characteristics as embodied in the magnet of FIG. 1.
Figure 2D:
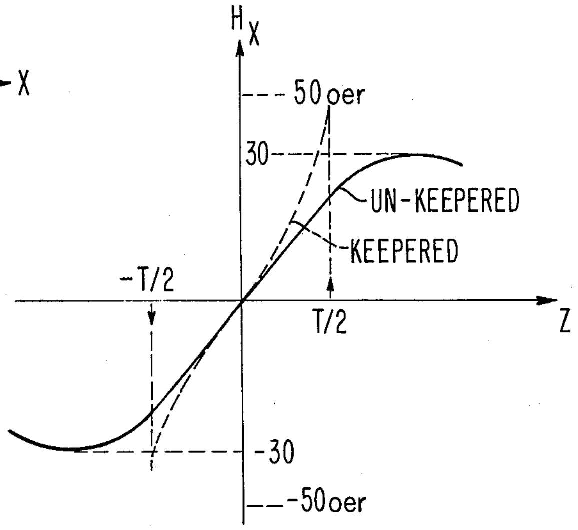
Figure 2B:
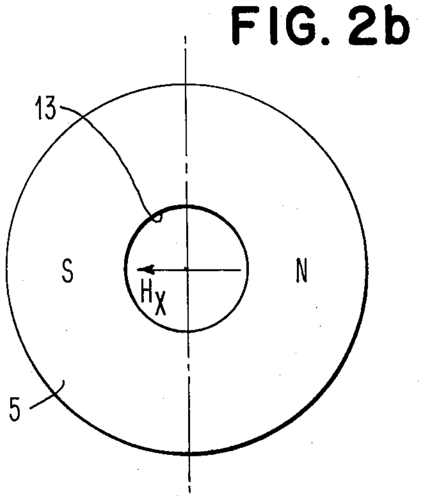

Turning to FIGS. 2*a* and 2*b*, the ring magnet 5 of the preferred embodiment as shown in FIG. 1 is illustrated in greater detail.

Figure 2C:
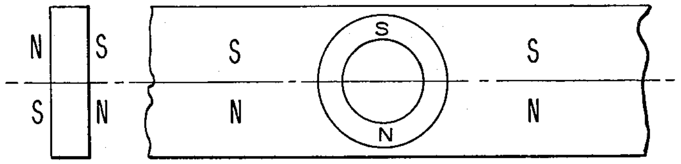

FIG. 2*a* illustrates a cross-sectional view of magnet 5 and FIG. 2*b* illustrates a top vertical view taken of FIG. 2*a*. The annular, doubly magnetized magnet 5 in FIG. 2*a* is produced as illustrated in FIG. 2*c* by stamping, or otherwise machining, the annular portion from a piece of doubly magnetized strip magnet material, such as Plastiform 1H, (a trademark of the 3–M Company) which is a barrium ferrite filled rubber base material which has been magnetized permanently to the polarity shown in FIG. 2*c*. This material is described in detail in the Plastiform Permanent Magnet specification sheets available from the Dielectric Material and Systems Division of the 3–M Company. As discussed in the aforementioned sales brochure, the magnetic properties of the Plastiform magnets are equal to those displayed by isotropic barium ferrite sintered magnets. However, due to the difficulty in forming or machining hard sintered barium ferrite, which is a fragile ceramic material machinable only by grinding, the preferred embodiment uses the simple rubber bonded permanent magnet material.

Returning to FIG. 2*a*, the machined ring magnet 5 has been punched from a strip of material having thickness T and the two pole pairs south-north and north-south as shown. The polarity of the magnetic field in the horizontal or (X) axis changes across thickness T, passes through zero at the central point illustrated as the intersection of the Z and the X axes in FIG. 2*a*.

In FIG. 2*b*, the top view of FIG. 2*a*, the vector field $H_X$ as a function of Z is shown for the south-north magnetic pole pair on the top surface of ring magnet 5. The aperture 13 is made large enough to accommodate the sensor and will be described more specifically later.

Turning to FIG. 2*d*, the diametral flux field vector H(X) is plotted as a function of vertical distance in the Z axis as shown and reaches an amplitude of approximately 30 oersteds in the positive or negative polarity in symetrical fashion about center point located midway between thickness + (I/2) and − (I/2) as shown. The diametral magnetic field produced by the doubly polarized ring magnet 5 reverses its polarity along a plane which is parallel to the surface of the ring magnet and which is located at an altitude midway between the top and bottom surfaces thereof. This is the situation illustrated in FIGS. 2*a* and 2*d*.

Returning now to FIG. 1, the effect of the first and second restraint means or keeper rings 8 and 11 is as follows. These rings, while serving as a restraint, also serve to intensify the diametral magnetic field which is directed along the horizontal axis of the sensor (illustrated by the dashed line in FIG. 2*d*) by shunting the opposed flux field near the rings. When the key is in its normally undepressed state, ring magnet 5 is in contact, or is very close to and in magnetic coupling with, the upper keeper ring or restraint means 8. The key mechanism including plunger 4, key top 2 and magnet 5 are held in the upper position by the force of attraction between ring 8 and the doubly magnetized ring magnet 5. The attractive force depends on factors which will be discussed below. The intensity of the magnetizing field experienced by the sensor along its horizontal axis with the ring magnet 5 in the "up" and "down" positions can be controlled by changing the relative altitudes of the sensor's axis with respect to the ring magnet.

The diametral magnetizing field directed along the horizontal axis of the sensor, which field is produced by the doubly magnetized permanent ring magnet 5, is quite uniform is intensity at all radius values extending from the center of the ring magnet 5 to a distance approximately equal to its inside radius. In a preferred embodiment, the energizer ring magnet 5 is oriented as shown in FIG. 8*b* so that the angular direction between the central axis line of the sensor and the diametral line which divides the ring magnet 5 into two oppositely magnetized portions are perpendicular to each other.

The initial breakaway force required to separate ring magnet 5 from the upper keeper 8 is governed by the following basic conditions:

The force is proportional to the thickness T of the actuator ring magnet 5 and is also proportional to the thickness of keeper member 8. The force is proportional to the contact area between keeper elements and the faces or face of ring magnet 5, and is also proportional to the coersive force and magnetization of the ring magnet material. The force is also proportional to the relative permeability of the keeper member 8. Other specifics of design considerations for determining forces for any magnetic material complete with mathematical design formulas therefor, are available in the aforementioned sales material of the 3–M Company related to the Plastiform magnets or in standard treatises and texts on the subject of permanent magnet designs such as the Osbourne reference cited below.

For the field strength illustrated in FIG. 2*d*, in the preferred embodiment shown, the dimensions and thicknesses in size parameters to achieve an approximate breakaway force of 35 grams applied to key button 2 are as follows:

| Doubly Magnetized Ring Magnet | Keeper Rings |
|---|---|
| Material - Plastiform* 1-H | Material-Cold Rolled Steel |
| Coercive force ≈ 2000 Oersteds | Thickness≈.025 inches |
| Magnetization ≈ 2200 Oersteds | Inside Diameter≈.520 in. |
| Thickness ≅ .090 inches | Outside Diameter≈.700 in. |
| Outside Diameter ≅ .690 inches | |
| Inside Diameter ≅ .470 inches | |

The operation of the actuator shown in FIG. 1 will now be readily apparent. Initially, the operator depresses key top 2 and force builds up in response to the compression of return spring 3 and snap spring 6. The force continues to build up due to the attractive force between ring magnet 5 and upper restraint ring 8 until it reaches a breakaway force controlled by the above-noted magnet and keeper geometry conditions. At this point the energy stored in snap spring 6 rapidly moves the sliding portion of plunger 4 and ring magnet 5 in the downward direction. This occurs before the operator can remove his finger or decrease the force that he is applying.

At the instant breakaway occurs between ring magnet 5 and the upper restraint means 8, the magnetic flux experienced by the sensor along its central horizontal axis begins to change from the north-south orientation of the vector to a south-north vector, 180° apart. The ring magnet 5, under the impetus of stored energy in the snap spring 6, is moved rapidly by plunger 4 to its downward limit of travel set by flange 10 on base 9. The interactive attraction between the lower face of ring magnet 5 and the lower or second restraining means ring 11 partially shunts off the lower north-south magnetic field on that face of ring magnet 5. Further depression by the operator of key top 2 is either limited by contact between the upper face of the sliding joints 7 contacting the upper surface of the key top 2, or by the operator ceasing to depress the key top. It will be apparent to those skilled in the art that what has been presented in this actuator is a non-teasable actuator mechanism which, once set in motion when the breakaway point has been reached, cannot be stopped until there has been a complete traverse of the ring magnet from one position to another.

When the force on key top 2 is released, key top 2 is restored to its upward position under the impetus of stored energy in bias spring 3. During its upward travel, lifting flange 12 contacts a mating flange on a portion of plunger 4 and applies an upward force to breakaway ring magnet 5 from its attraction with lower restraint means 11. The reverse magnetic field flux change is then experienced along the central axis of the sensor.

Figure 3A:
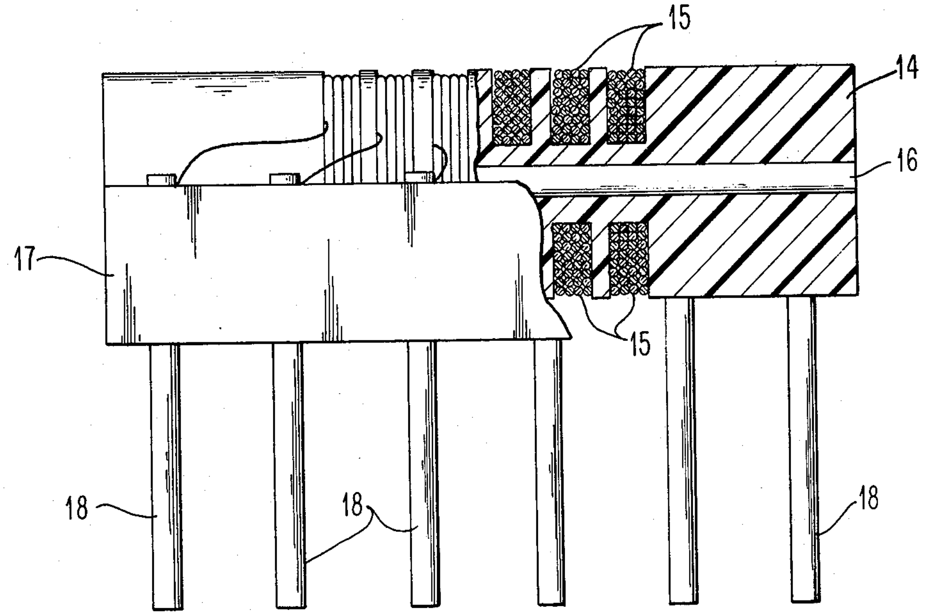
FIGS. 3*a* through 3*c* illustrate a sensor as utilized in the embodiment of FIG. 1.
Figure 3B:
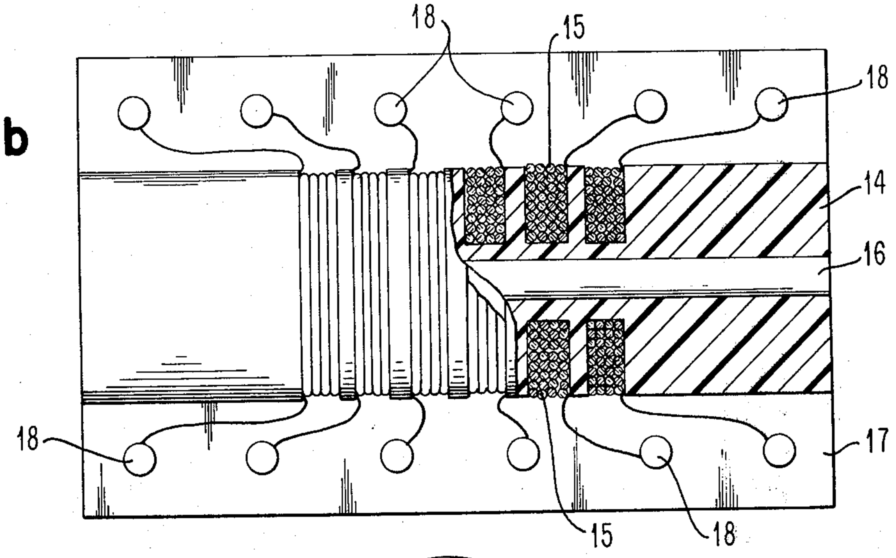
Figure 3C:
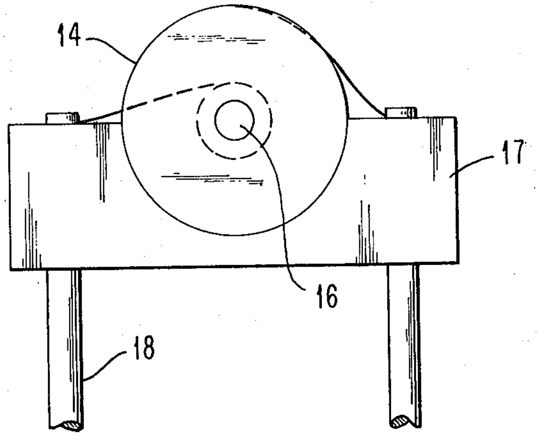

Turning now to FIGS. 3*a* –3*c*, the preferred embodiment of the sensor shown only in block form in FIG. 1 will be undertaken.

Figure 4A:
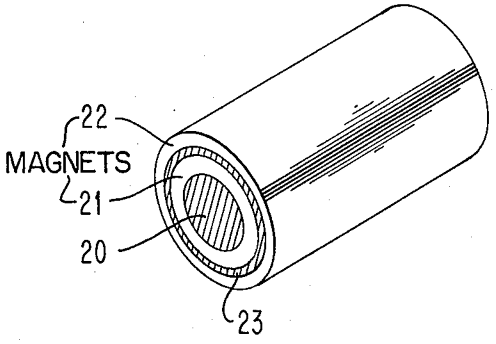
FIGS. 4*a* and 4*b* illustrate alternative embodiments of a switchable magnetically coupled pair of magnets utilized in the preferred embodiment of a sensor as shown in FIGS. 3*a*–3*c*.
Figure 4B:
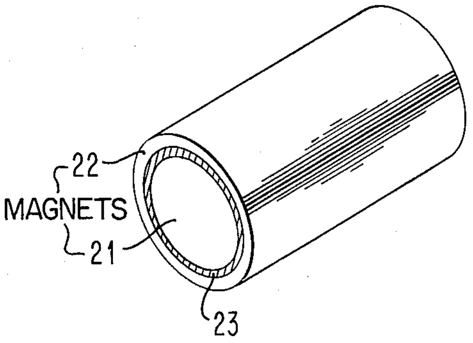

In FIG. 3*a*, the sensor is illustrated as consisting of a core or bobbin 14 on which are wound one or more multiturn sense coils 15 and through the central axis of which runs a sensing wire 16. The wire is of the plated magnetic film type such as is used in a storage device essentially like that shown in my prior U.S. Pat. Nos. 3,680,064 and 3,576,555, issued 8-25-72 and 4-27-71, respectively and assigned to the common assignee hereof. These two patents are hereby incorporated as providing teachings of suitable magnetic sensing wires or switchable magnetic means for the purposes of this invention and, as illustrated in FIG. 4*a* and 4*b*, two basic embodiments of this wire have found particular utility in the present invention. The embodiment shown in FIG. 4*a* is an adaptation of the cylindrical coupled magnetic film structure shown in the aforementioned patents. In FIG. 4*a*, a nonmagnetic conductive substrate 20, such as a berylium copper wire, is provided with two coaxial magnetic film platings 21 and 22 as taught in the aforementioned patents. The magnetic film layers are separated from one another by a conductive barrier 23 such as copper. The innermost magnetic layer 21 has a high coercive force, typically 100 oersteds or more. Such a film can be plated as taught in the patents from a nickel-cobalt solution containing phosphorus, for example. The outer magnetic layer 22 is a low coercive force nickel-iron plating. Both magnetic films are plated in the presence of a magnetic field which is directed along the wire axis in order to provide the magnetic layers with a high degree of uniaxial anisotropy. The composition of the nickel-iron film layer should be approximately 81 nickel, 19% iron to eliminate magneto-strictive effects.

The product of magnetization and film thickness of the high coercive force layer 21, the "hard" film, is required to exceed that for the lower coercive film layer 22, the "soft" film. The reason for this requirement stems from the need to develop a net longitudinal demagnetizing field, or bias filed, when the magnetization vectors within the inner and outer magnetic layers are oriented in an anti-parallel sense. This requirement was avoided in the aforementioned patents in order to produce a bistable device, but it is useful in the present embodiment and can easily be obtained as taught in the aforementioned patents. This creates a structure in which the magnetic coupled films are normally stable and anti-parallel due to the end effects of the hard magnetic material acting to align magnetization within the soft magnetic material opposite to the direction of magnetization within the hard film and parallel to its preferred magnetic direction set in at the deposition thereof.

Figure 5:
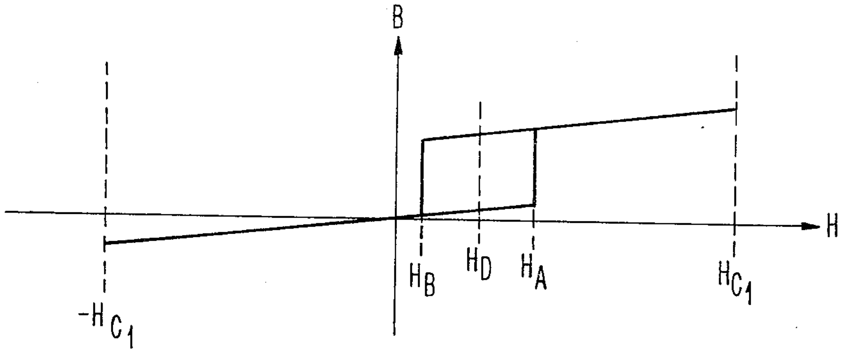
FIG. 5 illustrates a hysteresis curve for one of the magnetic devices of FIG. 4*a* or 4*b* when subjected to a changing intensity and polarity magnetic flux field.

It is preferred that the average net demagnetizing field within the anti-parallel couple film be greater than or equal to the coercive force of the soft film. FIG. 5 illustrates the BH properties required of the magnetic structure in FIG. 4*a* and FIG. 4*b* for all magnetizing field values less than $H_{cl}$, the coercive force of the hard magnetic layer.

In FIG. 5, it is evident that the BH properties of the composite structure exhibit a hysteresis loop which is displaced from the $H = 0$ axis by some amount. The center of the loop, which is displaced, is displaced by a value HD given by equation 1, $$H_D = N_D\,[M_{S1} \cdot T_1 - M_{S2} \cdot T_2] \qquad (1)$$

where $N_D$ is the demagnetizing factor, $M_{S1}$ is the saturation magnetization within the hard film wire, $T_1$ is the thickness of the hard film, $M_{S2}$ is the saturation magnetization of the soft film layer and $T_2$ is the thickness of the soft magnetic film layer.

The net demagnetizing field, the displacing field $H_D$ for the structure in FIG. 4*b*, is given by equation 2.

$$H_D \approx N_D \left[ K \frac{M_{S1} D_1}{4\pi} - M_{S2} \cdot t_2 \right] \quad (2)$$

where $N_D$ is the demagnetizing factor which involves the length of the coaxial magnetic sensor, $M_{S1}$ is the magnetization within the hard magnetic wire substrate and $D$ is the diameter of the hard magnetic wire substrate.

Referring to FIG. 5, when the diametral field produced by the doubly magnetized ring magnet 5 of the actuator in FIG. 1 exceeds the value of the field strength $H_A$ in FIG. 5, magnetization in the outer film layer will switch by a wall motion mechanism to become aligned with the direction of magnetization within the lower film (or magnetic wire substrate shown in the case of FIG. 4*b*). The field values $H_A$ and $H_B$ have values given by equation 3 where:

$$H_A = H_D + H_{C2} \text{ and } H_B = H_D - H_{C2}. \quad (3)$$

Whenever this magnetic switching takes place, an electrical response signal will be sensed by the inductive pick up coil 15 in FIG. 3*a*. The amplitude of the electrical response signal thus generated is proportional to the velocity of the wall motion moving within the magnetic film layer. The duration of the response signal is inversely proportional to the wall velocity. When the magnetizing field produced by the actuator 5 reaches a value less than $H_B$, the magnetization within the outer magnetic film layer switches back to an antiparallel orientation. When this switching takes place, an electrical signal is developed similar to that occurring when $H$ is equal to $H_A$, but of opposite polarity. In order to properly operate this magnetic film couple, the externally applied magnetizing field must not exceed the coercive force $H_{C1}$ of the hard magnetic material except for the one time application of an intense field directed along the wire length to establish the initial orientation of the magnetization within the hard magnetic film layer.

Figure 6:
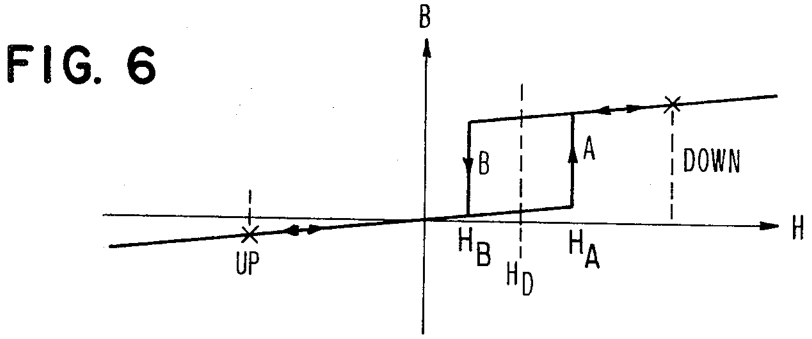
FIGS. 6 and 7 illustrate alternative hysteresis curves for a device as illustrated in FIGS. 4*a* or 4*b* with the polarity of magnet 5 of FIG. 1 in two different orientations and with the key in the up and down positions.
Figure 7:
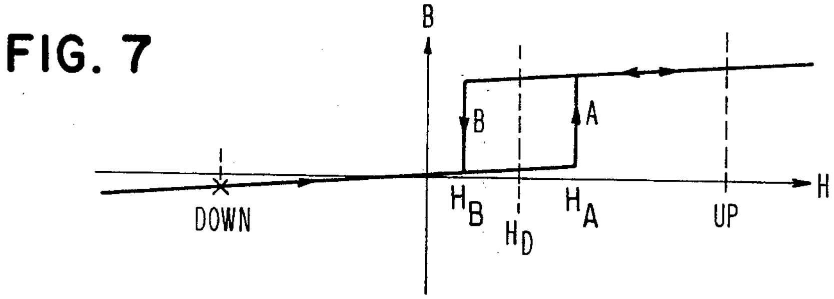

Turning to FIGS. 6 and 7, the intensity of the magnetizing field H experienced by the sensor with the energizing magnet 5 in the up and down positions can be controlled by changing the relative attitude of the sensor's axis with respect to the diametral line dividing north and south poles on the surface of ring magnet 5 as shown in FIG. 8*b*. There are two basic sensor energization modes illustrated in FIGS. 6 and 7 as follows. In FIG. 6 the first mode is illustrated in which the "up" position field strength has been illustrated to the left of the neutral axis. The key button "down" position is at the right of the neutral axis. Following along the hysteresis curve, the value $H_A$ is reached, at which point the film switches as the key is being depressed. On release of the key, the magnetization follows the hysteresis path to the point at which $H_B$ is reached producing the film switching. Field reversal continues until it ends at the point marked to the left of the neutral axis in the up position. FIG. 7 illustrates the condition with the polarity reversed and is otherwise the same as that shown in FIG. 6.

It is not necessary that the special magnetic film element be used as a sensor core in the present invention. Electrical response signals are produced by the abrupt magnet motion during key actuation with the use of ordinary iron or air in axial hole in place of sense wire 16 in FIG. 3*a*, but these response signals will be of considerably smaller amplitude and longer in duration since no induced magnetic switching takes place.

It is also obvious that cylindrical sensor of magnetic switching elements may be replaced by coplanar coupled flat films, or any other substantially coextensive magnetically coupled element similar to those described in my aforementioned patents.

Also, the support means or pedestal 9 can easily be modified or replaced with any suitable support to hold a sensor at the proper elevation relative to the magnet 5 as taught herein.

Furthermore, it is not necessary that the electrical pickup or sense coils be wrapped about the sensor core, it being clear that mere proximity of the pickup is sufficient so long as the switching flux field intercepts the pickup during switching.

KEYBOARD EMBODIMENT

Figure 8A:
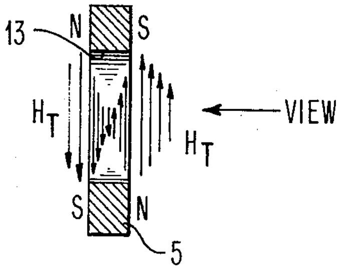
FIGS. 8*a* and 8*b* illustrate the views of a magnet 5 and its opposed diametral flux fields as utilized in an embodiment of the invention as shown in FIG. 1.
Figure 8B:
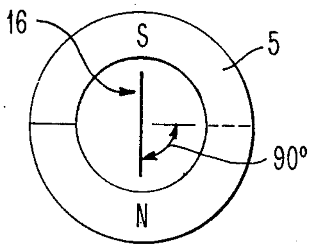

Turning now to FIGS. 8*a* and 8*b*, the aforementioned orientation of the sensor, and specifically of the coupled magnetic film core 16 with relationship to actuator magnet 5 is shown. Sensor core 16 is set at 90° to the diametral line between south and north poles of actuator magnet 5 as illustrated. FIG. 8*a* is a crosssectional view taken through magnet 5 and illustrates the field gradiant across the aperture 13 of magnet 5 in the diametral direction, the importance of which was previously discussed.

FIGS. 3*a–c* illustrate an enlarged portion of the sensor of FIG. 1 and show the core body 14 in FIG. 3*a* mounted on a substrate or circuit board 17 through which protrude conductors 18 for connection to the N-turn sense windings 15 shown in FIGS. 3*a*–3*c*. The core sense wire 16 is better seen in the end view, FIG. 3*c*, in which the assembly can be seen to advantage.

Figure 9:
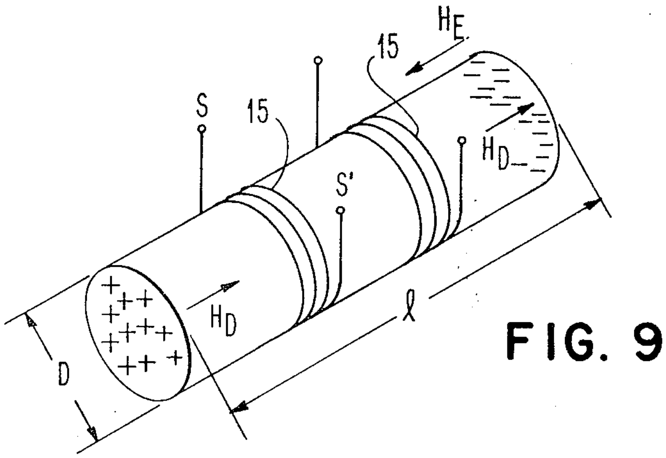
FIG. 9 illustrates in schematic form a magnetic flux sensor for use in the preferred embodiment.

Turning to FIG. 9, a sense core comprising one of the magnetic film couple embodiments of either FIG. 4*a* or 4*b* is illustrated schematically with plural N-turn coils 15 wound about it. The sensor wire 16, as a permanent magnet, should have a length $L$ described according to the following considerations which apply to all permanent magnets:

$L$ is proportional to $D$ and proportional to the thickness of the soft and hard magnetic film layers. The exact expression for $L$ is very complex and is not in closed mathematical form as a result of an eliptic integral solution which is required to determine the demagnetizing field and demagnetizing factor $N_D$. A classic reference for these formulae is, "Demagnetizing Factors of the General Elipsoid," by J. A. Osbourne, Physical Review, Vol. 67, Nos. 11 and 12, June 1 and 15, 1945, from which any person desiring to build such a device can obtain the required information for choosing an optimum $L$, $N_D$, $K$, etc., and a diameter $D$ as described with relationship to equation 2. Typical examples for the N turns of wire would be 20 turns wrapped around a 20 mil diameter core having a length of 0.35 inches.

Figure 10A:
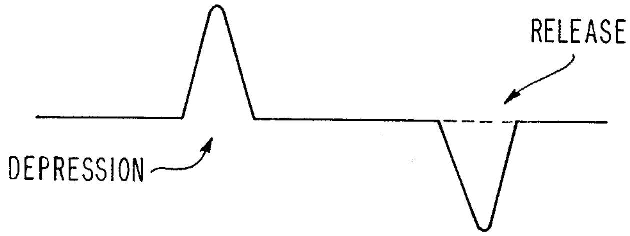
FIGS. 10*a* through 10*c* illustrate the electrical output signal waveforms produced by the embodiment of FIG. 1 in response to a key depression and using a sensor such as shown in FIGS. 3 or 9.
Figure 10B:
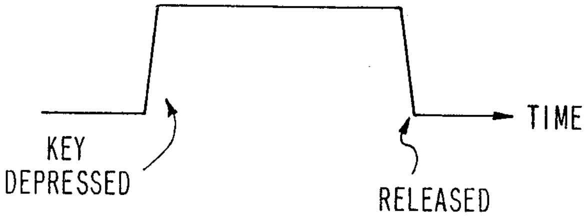
Figure 10C:
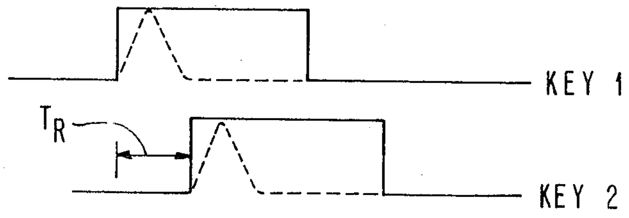

It will be appreciated by those of skill in the art that, on depression of a given key actuator, two opposite polarity pulses will be produced, one when the actuator is depressed and one when the actuator is released. This fact may be used to advantage in a keyboard where N-key roll operation is desired. If it be assumed that a positive-going pulse is produced at the depression of a key as illustrated in FIGS. 10*a* and 10*b*, a sense amplifier (not shown) connected via the conductors 18, FIG. 11*a*, to a specific coil 15, FIG. 9, which is placed about a given sensor wire 16, FIG. 3*a*, would produce an output voltage wave form as shown. A positive-going pulse is produced on depression and a negative-going pulse on release. If it is desired to eliminate all interference from multiple key depression, logic in the sense amplifier circuitry can be introduced to require that a key depression and release be sensed before any other key depressions and releases are gated to the using system. If N-key roll techniques are desired, the pulse during depression alone can be used to gate the output from the specific key. The duration of the positive-going pulses using the magnetic switching sensor is substantially independent of the velocity of travel between magnet 5 and the sensor wire 16 which is, in turn, controlled by the spring force of spring 6 in FIG. 1 and by the considerations already pointed out relative to the thickness of the upper restraint means 8, its area of contact with magnet 5, etc. This is quite important since it insures that the output pulses will be of constant duration and amplitude, as is most desirable. Of course, the mass of magnet 5 also enters into this as is well known from basic physics. FIG. 10*c* illustrates the situation where two keys are depressed in sequence and are held depressed during a portion of their time in common. The time interval $T_R$ is illustrated between the positive-going pulses as the two keys are depressed in sequence. In order to accurately recognize two separate key depressions, the width of the positive going pulse produced during a depression must be narrower than the minimum $T_R$ expected when two keys are depressed. It is virtually impossible to depress two keys actually simultaneously at depression and they will nearly always be separated by some amount of time. The maximum roll rate, in principle, is determined by the time interval $T_R$ and should generally be at least 4 milliseconds between depressions as sensed by the sensor. This, in fact, is usually met by human operators and in fact is far exceeded since the minimum time interval between key depressions, even when an operator attempts to depress keys simultaneously, is usually on the order of four or more milliseconds. As shown in FIG. 10*c*, the negative-going release pulse produced as shown in FIG. 10*a* is disregarded and is not used in the N-key roll operation.

Figure 11A:
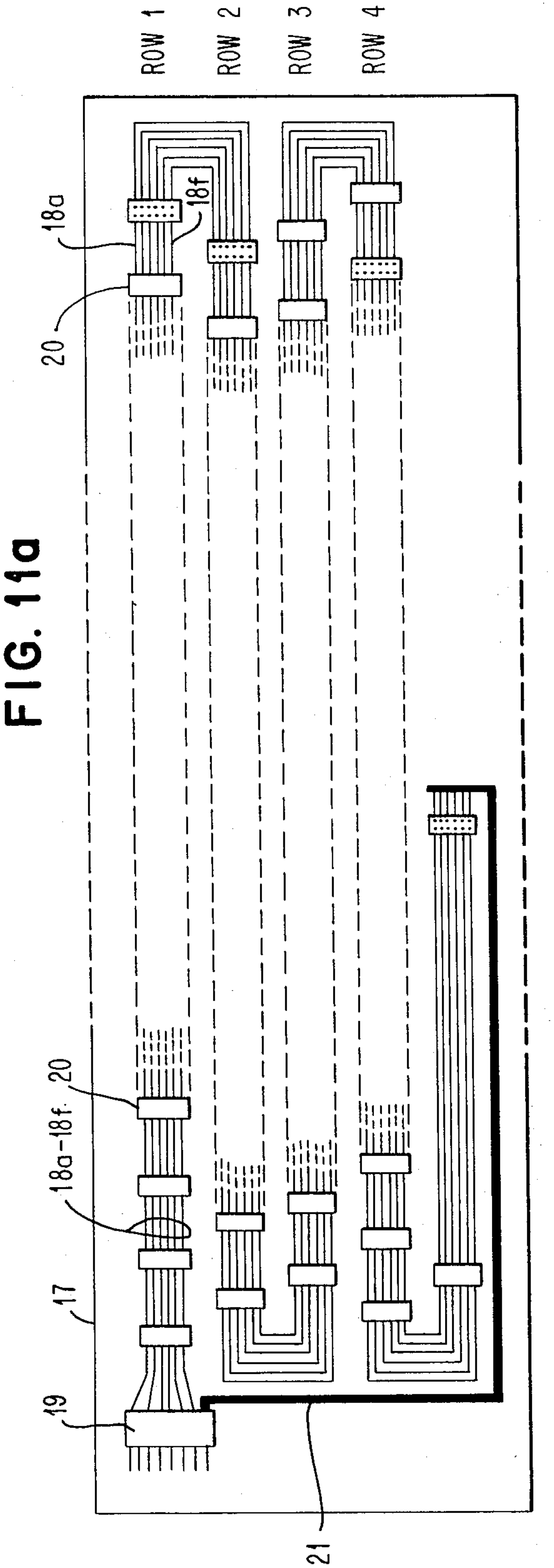
FIGS. 11*a* through 11*c* illustrate the manner of assembling and connecting multiple key devices such as shown in FIG. 1 to make up a plural key keyboard.
Figure 11C:
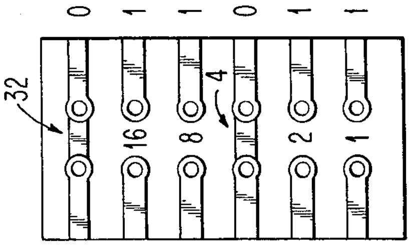
Figure 11B:
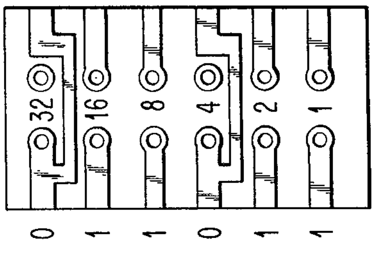

Turning to FIG. 11*a* –11*c*, the typical interconnection scheme for a plurality of keys on a keyboard 17 connected via conductors 18*a–f* to a sense amplifier 19 is shown. Sense amplifier 19 could be any of a plurality of types available today and the bipolar amplifying characteristics of commercially available integrated circuit chips would be most desirable in order to amplify both positive and negative-going pulses. There should be one sense amplifier channel for each of the separate sense coils 15 in a given individual key actuator. Key positions are illustrated as 20 in FIG. 11 and are understood to contain, for this example, at least six individual coils per key in the embodiment illustrated. The coils in corresponding positions (such as all connected to line number 18*a* of FIG. 11*a* or line 18*f*, etc.) are connected in series. For a typical 64-key keyboard configuration such as shown in FIG. 11*a*, six coils per key are required to define a binary code of 64 different entities. FIG. 11*b* illustrates this concept in which pairs of individual contacts 18, representing units, twos, fours, eights, sixteens, and thirty-twos are shown. These represent coil positions for six coils 15 in a typical key module. The coding of a given key module is accomplished in one of two ways as illustrated in FIGS. 11*b* and 11*c* by either shorting out two of the terminals 18 where it is desired to create a zero, such as shown in FIG. 11*c*, or by bypassing a given coil 15 by not connecting one of its legs in series, such as is shown to create the zeros in positions in FIG. 11*b*. Using this approach, each key module could be provided with six coils 15 which could be selectively connected or shorted to create the proper coding for each key. It is apparent that on the depression of a given key module, only the connected coils (or unshunted ones) will produce electrical signals on the various signal lines 18*a* through *f*. These signals will be sensed separately by the amplifier channels in sense amplifier 19. As shown in FIG. 11*a*, a ground line or shielding line 21 terminates all of the sense lines 18 and is connected back to the sense amplifier 19 to serve as a ground reference level so that noise impulses appearing across all of the lines can be automatically cancelled out in the sense amplifier. A similar technique which is well known is to run common mode noise rejection conductors on the circuit substrate 17 beside the individual key modules 20, and of approximately the same copper area, all connected together and connected back to ground at the sense amplifier so that injected RF noise or capacitive coupled noise from the environment will also be coupled to the common mode noise rejection line to float the balance of the sense amplifier up or down proportionately for sensing signals, even under noise conditions.

As will be apparent to those skilled in the art, with reference to the individual key design such as shown in FIG. 1, many changes may be made without departing from the spirit and scope of the invention. For example, the first and second restraint means or keeper rings can also be permanent magnets instead of ferro-magnetic materials. It is also possible to eliminate the snap spring 6 and replace it with a solid column or push rod 4 and allow the breakaway of magnetic attraction between magnet 5 and its keeper 8 to provide the snap action under the impetus of the human operator's finger, since he will be unable to stop pushing fast enough to prevent actuation, although this is not as desirable as the embodiment illustrated. Also, as will be apparent to those skilled in the art, it is not necessary that the special coupled magnetic films be used as the sensing element wire 16, although it is more desirable to use this since the amplitude of the signal produced is greatly increased and the switching signal duration is substantially independent of key stroke velocity as previously stated.

The keyboard or key modules as described, are self-energized and self-scanned, as those terms are generally used, since no external scanning or connecting sequencer is required in sampling the output from the keys or in powering the sensors for the keys to pick up changes in key actuation. The mechanism is inherently bounceless since the magnetic switching of the coaxial magnetic film sensor wire 16 occurs in response to a magnetic field intensity, not a mechanical or mass sensitive actuation. The ability to provide a completely encoded output on a parallel set of N lines, each of which represents one data bit in a given code format, is also desirable. The ease with which individual key modules may be encoded by shunting or short-circuiting individual sense coils to provide coded one or zero bit designations is also apparent.

While the invention has been particularly shown and described with reference to a preferred embodiment thereof, it will be understood by those of skill in the art that various changes in form and detail may be made therein without departing from the spirit and scope of the invention.

What is claimed is:

1. A snap action, magnetic flux reversing, key actuator mechanism, comprising:

a housing;

a plunger mounted in said housing for sliding reciprocal movement between a first and a second position therein;

means connected to said plunger for applying a motive force thereto to move said plunger from said first to said second position;

a doubly polarized, permanently magnetized, annular ring magnet means having 180° opposed diametral flux fields, said fields being directed in an opposed sense relative to one another across the opening of said magnet and parallel to the faces thereof;

said magnet means being connected to said plunger means for movement thereby between said first and second positions;

a first, suddenly yieldable restraint means in said housing and located at said first position for yieldably restraining and suddenly releasing movement of said magnet means from said first position under the impetus of said plunger when moving in the direction of said second position; and support means in said housing having a surface located between said first and second positions and in axial alignment with the aperture of said magnet means for supporting apparatus at an altitude to be within first one of said opposed diametral flux fields of said magnet means, and then the other of said opposed diametral flux fields, and inside the periphery of said annulus of said magnet means, when said magnet means is moved from said first to said second position, thereby exposing said supported apparatus to a 180° flux reversal along a plane located at said altitude maintained by said support means.

2. Apparatus as described in claim 1, further comprising:

a lost motion connection for connecting said magnet means to said plunger so as to allow a limited degree of motion by said plunger without moving said magnet means.

3. Apparatus as described in claim 2, further comprising:

a resilient energy storage and release means located between said plunger and said magnet means for absorbing the energy expended in moving said plunger through the independent travel thereof which is permitted by said lost motion connection, and for releasing said energy in a sudden snapping motion when said first suddenly yieldable restraint means releases said magnet means, thereby to impel said magnet rapidly towards said second position.

4. Apparatus as described in claim 1, wherein:

said first restraint means comprises a ferromagnetic keeper means affixed to said housing at said first position for restraining said magnet means by magnetic attraction therebetween and for shunting the one of said two opposed diametral flux fields of said magnet means on the surface closest thereto.

5. Apparatus as described in claim 4, further comprising:

a second suddenly yieldable restraint means in said housing, located in proximity to said second position for yieldably restraining and suddenly releasing movement of said magnet means under the impetus of said plunger moving in the direction of said first position.

6. Apparatus as described in claim 5, further including:

a resilient spring biasing means operatively engaged with said plunger and with said housing for resiliently biasing said plunger toward said first position.

7. Apparatus as described in claim 6, further comprising:

a lost motion connection for connecting said magnet means to said plunger so as to allow a limited degree of motion by said plunger without moving said magnet means.

8. Apparatus as described in claim 7, further comprising:

a resilient energy storage and release means located between said plunger and said magnet means for absorbing the energy expended in moving said plunger through the independent travel thereof which is permitted by said lost motion connection, and for releasing said energy in a sudden snapping motion when said first suddenly yieldable restraint means releases said magnet means, thereby to impel said magnet rapidly towards said second position.

9. Apparatus as described in claim 5, further comprising:

a lost motion connection for connecting said magnet means to said plunger so as to allow a limited degree of motion by said plunger without moving said magnet means.

10. Apparatus as described in claim 9, further comprising:

a resilient energy storage and release means located between said plunger and said magnet means for absorbing the energy expended in moving said plunger through the independent travel thereof which is permitted by said lost motion connection, and for releasing said energy in a sudden snapping motion when said first suddenly yieldable restraint means releases said magnet means, thereby to impel said magnet rapidly towards said second position.

11. Apparatus as described in claim 4, further comprising:

a lost motion connection for connecting said magnet means to said plunger so as to allow a limited degree of motion by said plunger without moving said magnet means.

12. Apparatus as described in claim 11, further comprising:

a resilient energy storage and release means located between said plunger and said magnet means for absorbing the energy expended in moving said plunger through the independent travel thereof which is permitted by said lost motion connection, and for releasing said energy in a sudden snapping motion when said first suddenly yieldable restraint means releases said magnet means, thereby to impel said magnet rapidly towards said second position.

13. A self-energizing data encoding key apparatus, comprising:

a housing;

a plunger mounted in said housing for sliding reciprocal movement between a first and a second position therein;

means connected to said plunger for applying a motive force thereto to move said plunger from said first to said second position;

a doubly polarized, permanently magnetized, annular ring magnet means having 180° opposed diametral flux fields, said fields for creating said opposite fields separate from one another across the opening of said magnet and directed parallel to the faces thereof;

said magnet means being connected to said plunger means for movement thereby between said first and second positions;

a first, suddenly yieldable restraint means in said housing and located at said first position for yieldably restraining and suddenly releasing movement of said magnet means from said first position under the impetus of said plunger when moving in the direction of said second position; and support means in said housing having a surface located between said first and second positions and in axial alignment with the aperture of said magnet means for supporting apparatus at an altitude to be within first one of said opposed diametral flux fields of said magnet means, and then the other of said opposed diametral flux fields, and inside the periphery of said annulus of said magnet means, when said magnet means is moved from said first to said second position, thereby exposing said suproted apparatus to a 180° flux reversal along a plane located at said altitude maintained by said support means;

a flux sensitive magnetic sensor for generating electrical signals when subjected to changing magnetic flux fields; and said sensor being located on said support means so as to be exposed to said 180° opposed diametral flux fields of said doubly polarized magnet means during the motion thereof between said first and second positions.

14. Apparatus as described in claim 13, wherein:

said sensor comprises a switchable polarity, magnetically coupled pair of permanent magnets;

said magnets being separated by a conductive, non-magnetic barrier;

said magnets being so magnetized as to assume an opposed field vector relationship to one another in the absence of other external magnetic fields, said vectors being switchable to a parallel state upon being subjected to an external magnetic flux field of the proper intensity and direction;

said first permanent magnet being overlain by said non-magnetic barrier layer; and said second permanent magnet overlying said barrier layer; and at least one inductive pickup electrical signal producing means adjacent to said magnetically coupled pair of magnets and oriented to be subjected to the switching magnetic field vector of said pair when said switching action of the magnetic vectors occurs in response to said external magnetic flux field, for generating an electrical data signal indicative of the switching taking place.

* * * * *